Figure 1:
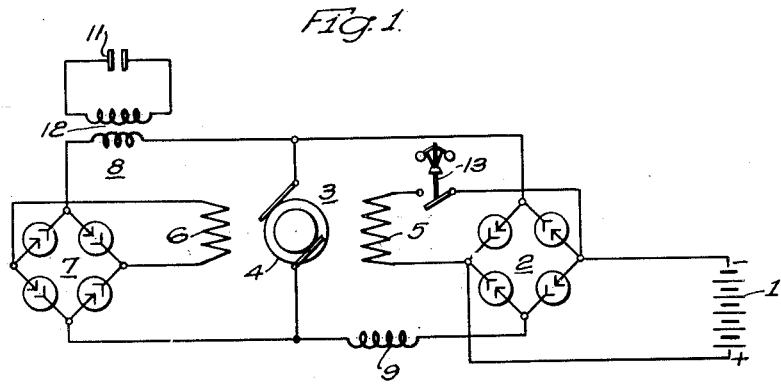

INVENTOR
Alfred L. Atherton.
BY
ATTORNEY

Patented Sept. 13, 1932

1,876,548

UNITED STATES PATENT OFFICE

ALFRED L. ATHERTON, OF VERONA, PENNSYLVANIA, ASSIGNOR TO WESTINGHOUSE ELECTRIC & MANUFACTURING COMPANY, A CORPORATION OF PENNSYLVANIA

BATTERY-CHARGING MEANS

Application filed March 6, 1929. Serial No. 344,752.

My invention relates to voltage-regulating devices and particularly to means for regulating the voltage of variable-speed generators, and means for regulating the speed of motors supplied from variable-voltage sources.

One object of my invention is to provide means for maintaining the voltage of an electrical generator constant, notwithstanding variations of the speed at which it is driven.

Another object of my invention it to provide means for varying the field excitation of a dynamo-electric machine in response to variations of frequency in an electric circuit.

Another object of my invention it to provide a method of operating control means in response to variations of frequency of an alternating-current circuit.

Another object of my invention is to derive a direct current which varies with the frequency of an alternating-current circuit.

A further object of my invention is to provide an electric motor with means tending to minimize speed variations thereof consequent upon variations of the supply voltage impressed upon it.

Figure 2:
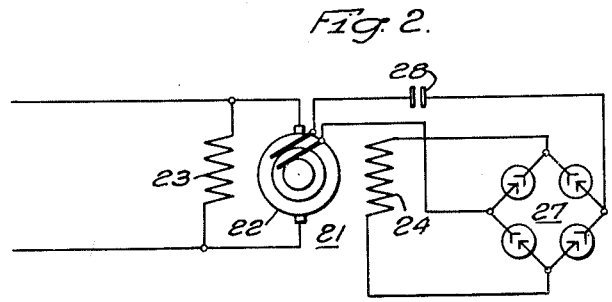

Other objects of my invention will become evident upon reading the following specification, taken in connection with the drawing, in which;

Figure 1 is a diagrammatic view of an alternating-current generator and control means embodying my invention, Fig. 2 is a similar view of a direct-current motor and control means embodying my invention.

For operating lighting and other devices on automobiles, trains and other vehicles which must, in the nature of things, vary over wide ranges of speed from time to time and even be stationary for considerable periods, it is necessary to provide storage batteries. In order to maintain such batteries in charged condition, it is convenient to provide electrical generators to be driven at speeds proportional to those of the vehicles which transport them. Since the voltages of such batteries are substantially constant, a problem is presented in devising means which shall fit the electrical generators for their charging function. As is well known, the voltage of ordinary direct-current generators and alternating-current generators is proportional to the speeds at which they are driven, if their field excitations remain constant. On the other hand, it is most desirable to have a source of substantially constant voltage for charging the storage battery previously described. The problem of fitting a variable-speed generator to supply charging current to a storage battery accordingly reduces to the problem of properly regulating the exciting current of the generator to maintain constant voltage, notwithstanding variations of speed of the latter.

Various arrangements have previously been devised for performing the foregoing function but they have proved unsatisfactory when subjected to many of the conditions under which they are required to operate; to particularize, they lack the simplicity, reliability and freedom from moving mechanical parts which are most desirable in apparatus of the foregoing character.

As a feature of my invention, I provide means for regulating the exciting current of a variable-speed generator automatically in such fashion as to maintain substantially constant terminal voltage over an extremely wide range of speed; and I accomplish the foregoing result by means of apparatus involving no moving mechanical elements, and which remains unchanged in its electrical characteristics throughout extremely long periods of operation.

In accordance with another feature of my invention, I make it possible to avoid the use of the relatively expensive direct-current generators with their auxiliary commutators and brushes, now, I believe, universally employed in vehicle-lighting systems, and also avoid the necessity of providing the series cutout between the generator and battery which is an essential part of the present lighting system, substituting for both the foregoing elements a simple, rugged and thoroughly reliable contact rectifier unaffected by mechanical jars and vibration and having a practically infinite operative life.

In accordance with a still further feature of my invention, I provide a direct-current motor with exciting means which tend to minimize the variations which its speed would otherwise undergo, as a result of fluctuations of its supply voltage.

With the foregoing principles and objects of the invention in mind, my invention may best be understood by reference to the drawing, Fig. 1 of which shows an electric storage battery 1 adapted to be mounted upon a railway train or other variable-speed vehicle and supplied through a rectifier 2 which is preferably of the copper-oxide type, from an alternating-current generator 3. The alternating-current generator 3 has an armature 4 of conventional type and is provided with an exciting winding 5 which may conveniently be supplied, at substantially constant voltage, from the battery 1. The generator 3 is likewise provided with a second exciting winding 6 which is supplied with current through a second rectifier 7 and a capacitance 8 which serially connects it to the terminals of generator 3. For many purposes, it will be found desirable to provide an inductance 9 in one or both of the leads connecting the generator 3 to the rectifier 2.

The rectifiers 2 and 7 are shown in a usual connection in which four uni-laterally conductive elements are connected to form the sides of a square, the alternating-current circuit being connected across one diagonal of this square, and the direct-current load being connected across the other diagonal. Such rectifier connections are well known in the art and are believed to require no further description here.

In many cases, it will be found most convenient that the capacitance 8 shall comprise a condenser 11 connected in the secondary circuit of a transformer 12, the primary of which is connected in the alternating-current line in which it is desired to insert the capacitance. The arrangement shown in Fig. 1 is of this nature.

If desired, a centrifugally operated switch 13 may be provided to open the field circuit 5 when the speed of the generator 3 is below a desired critical value.

Such being the connections of the electrical circuits, it will be apparent that, when the vehicle carrying the foregoing system is stationary, there will be no voltage at the terminals of the generator 3, and hence, no voltage will be impressed upon the corresponding diagonal of rectifier 2. Since, however, current can flow through each element of rectifier 2 only in the direction indicated by the arrows, it will be seen that no current can flow from battery 1 through armature 4, so long as the voltage of generator 3 is less than that of battery 1.

As the speed of the generator 3 rises, it will build up and generate an alternating voltage as the result of its constant excitation from the field 5 which is connected across the terminals of battery 1. The frequency generated by generator 3 is, of course, proportional to its speed. Current will flow from its terminals through capacitance 8 and rectifier 7, and the latter will supply a direct current to the exciting winding 6. The latter is so arranged as to produce a magnetic effect opposite to that of winding 5. The effect of variations of generator speed, which may be denoted by S, on the exciting current, I6, flowing in winding 6 will now be considered.

If, as is preferably here the case, the impedance of rectifier 7 is small relative to that of capacitance 8, the current flowing through windings 6 will be proportional to the quotient of the voltage of generator divided by the impedance of capacitance 8. This may be expressed mathematically by the equation $$I6 = \frac{AE}{Z},$$

where E is voltage generated in armature 4, Z is impedance of capacitance 8 and A is a constant.

The frequency generated by generator 3 is proportional to its speed. The impedance Z of a capacitance being, as is well known, inversely proportional to a frequency, we may write $$Z = \frac{b}{s}.$$

The amount of current flowing through winding 6 will then be expressed by the equation $$I6 = \frac{AES}{b}.$$

Since the magnetic effect of winding 6 is opposite to that of winding 5, it will be readily seen that, with constant voltage E across its terminals, the excitation of generator 3 is proportional to $$K - \frac{AE}{b}S,$$

K corresponding to the constant positive excitation due to field winding 5, and $$\frac{AE}{b}S$$

to the negative excitation due to the current in field winding 6.

Since the voltage of generator 3 is proportional to the product of its speed $s$, by its net excitation, $$K - \frac{AE}{b}S,$$

the voltage of generator 3 will be seen to be proportional to $$Ks - \frac{AE}{b}S^2.$$

By properly proportioning the windings 5 and 6, which determine the actual values of constant K, $a$ and $b$, the voltage $$Ks - \frac{AE}{b}S^2$$

can be maintained constant over a considerable range of values of the speed $s$. Correspondingly, the generator 3 is a constant-voltage generator well suited to supply charging current to battery 1 over its entire range of speeds. The rectifier 2, of course, changes the alternating-current output of generator 3 to direct-current input suitable for charging battery 1.

The foregoing considers, of course, only the major factors involved and are given merely to illustrate the principles on which general design should be based. The elaborations of the method necessary to take account of magnetic leakage, internal impedance of the generator and the like will be clear to engineers skilled in electrical design.

It will thus be seen that the foregoing arrangement provides a means of regulating a variable-speed generator to supply constant voltage and to charge a direct-current load. All of the circuit elements above described are simple and rugged in construction and comprise no moving mechanical elements. The result is a battery-charging system embodying many extremely desirable characteristics for train lighting and other similar services.

Referring to the arrangement illustrated in Fig. 2, a direct-current motor 21 is provided with an armature 22 and a shunt field winding 23 of conventional form. In accordance with well known electrical laws, the speed of a shunt motor may be expressed by the equation $$s = \frac{E}{F}$$

in which E is line voltage and F is magnetic-field strength.

In the ordinary motor, the exciting current in the shunt winding is proportional to E, and, if field strength F were strictly proportional to exciting current, the speed S would not vary with the line voltage E. However, because of saturation effects in the iron field core, field strength F is not proportional to exciting current, and, accordingly, the speed rises with increase of line voltage. If, however, means could be found for increasing the total field excitation F upon any slight rise of speed of the motor, the net fluctuations in speed would be decreased.

In accordance with this further feature of my invention, therefore, I provide an exciting winding 24 for the motor 21 and supply it with current derived from a pair of slip rings carried by armature 22. The winding 24 is connected to the slip rings through a rectifier 27 and a capacitance 28.

In accordance with the principles discussed in connection with Fig. 1, an increase in speed of motor 21 results in an increase in frequency of the alternating current supplied by the slip rings, through capacitance 28 and rectifier 27, to winding 24. The impedance of capacitance 28, being preferably larger than that of rectifier 27 and winding 24, such increase of frequency results in an increase of current through capacitance 28 and, accordingly, in an increase in the direct current supplied by rectifier 27 to winding 24. Winding 24 is so arranged that this increase of current increases the net excitation of motor 21 and, accordingly, increases the value of field strength F in the foregoing formula. As a result, it will be seen that the increase of speed, S, which otherwise would be consequent upon an increase of impressed voltage E, will be minimized by the above-mentioned simultaneous increase of field strength F. The speed variations of the motor consequent upon changes of line voltage will, therefore, be minimized.

It will be recognized that the principles which have been embodied in the embodiments of my invention hereinbefore described are capable of wider application. Thus, the current which is derived from rectifier 7 and capacitance 8 in Fig. 1 and which varies with the frequency of the alternating voltage impressed upon that circuit, may be utilized to govern other control or regulating means than an exciting winding, such as 6. It may, for example, actuate control devices and relays of any suitable description known in the electrical art. By employing this principle, therefore, it is possible to control apparatus of various kinds responsively to variations of frequency in an alternating-current circuit. The arrangement is, in fact, adapted to derive a direct current which varies with the frequency in any alternating-current circuit, and a wide variety of uses for such an arrangement will be readily apparent to those skilled in the electrical art.

The foregoing arrangements are given as instances of particular ways in which the principles of my invention may be employed, but its applicability is not confined thereto. It will also be recognized that, while I have described the rectifiers employed as being of the copper-oxide variety, many other types of rectifiers will be found suitable in many instances in which the principles of the invention may be employed. The arrangement in which a capacitance and a rectifier supply a control circuit is likewise applicable to generators in which an ordinary commutator having brushes is tapped at appropriate positions to be connected to the armature winding of a variable-speed generator and is used to supply current to a direct-current load, the commutator replacing the separate contact rectifier supplied from the alternating-current terminals of the armature, as disclosed in Fig. 1. It will be recognized, accordingly, that the circuit elements above described are adjunctive in their action and that, in certain instances, it may be desirable to employ either rectifier without the conjunctive action of the other.

In accordance with the foregoing, I desire that the following claims shall be interpreted with full realization that the principles of my invention are not intended to be limited to the particular embodiments above described and that their terms shall be given the broadest interpretation of which they are susceptible in view of their express limitations and of the prior art.

I claim as my invention:

1. In combination with a source of electromotive force which comprises an armature and two field windings, said windings being connected in opposition, means for supplying a substantially constant direct current to one of said windings, and means including a capacitance and a rectifier for supplying direct current to the other winding which varies in value in response to variations in the speed of rotation of said armature.

2. In combination with a source of electromotive force which comprises an armature and two field windings, means for supplying a substantially constant direct current to one of said windings, and means including a reactance and a rectifier for supplying direct current of such value to the other winding that the combined field strength of the two windings is reduced in value in response to an increase in speed of rotation of said armature.

In testimony whereof, I have hereunto subscribed my name this 15th day of February, 1929.

ALFRED L. ATHERTON.